March 19, 1963 H. G. ANDRÉ 3,082,279
ALKALINE BATTERY AND ELECTRODE THEREFOR
Original Filed May 15, 1956

INVENTOR.
HENRI GEORGES ANDRÉ
BY
ATTORNEY 3,082,279
ALKALINE BATTERY AND ELECTRODE
THEREFOR
Henri Georges André, Montmorency, France, assignor to Yardney International Corp., New York, N.Y., a corporation of New York
Original application May 15, 1956, Ser. No. 584,906. Divided and this application Sept. 11, 1959, Ser. No. 845,048
Claims priority, application France May 17, 1955
5 Claims. (Cl. 136—34)

The present invention relates to an electrochemical generator of energy, such as a primary or secondary battery, of the alkaline type and to an electrode for such generator.

In the now conventional type of alkaline battery whose positive electrodes contain silver, the amount of energy capable of being delivered or stored generally depends primarily upon the mass and effective surfaces of these positive plates. Whereas the mass of the negative electrode material (e.g. zinc or cadmium) may be quite readily increased beyond the theoretical requirements, considerations of weight and cost impose more severe limitations upon the dimensioning of the positives. For the purpose of increasing the efficiency of such batteries in terms of energy output per gram of silver, the tendency has been toward thinner positive plates whose greater specific surface allows better utilization of the available metal.

It has not yet been feasible, so far as is known, to produce a practical silver plate of the porosity required for battery electrodes and of a thickness less than about half a millimeter. It is an object of the present invention to provide a plate of this description having a thickness substantially less than heretofore attainable, e.g. of the order of one tenth of a millimeter or less.

The extreme fragility of a plate of the thickness referred to makes it impractical to subject such plate to the amount of handling normally required in assembling a set of electrodes to produce a battery. It is another object of this invention, therefore, to provide a novel method of forming an electrode of the aforesaid character in situ within the assembled battery from a sturdier precursor which can be introduced into the casing without damage.

A further object of this invention is to provide a method of so forming a battery electrode within its ultimate surrounding that the plate when formed is immediately in a charged, i.e. oxidized, condition so that the battery can be taken instantly into use without a preliminary charging operation.

Still another object of the invention is to provide an electrode assembly adapted to be stored almost indefinitely in a state ready for instant activation by the addition of electrolyte.

An incidental object of this invention is to provide an alkaline battery with silver positive electrodes having a substantially constant output voltage, in contradistinction to conventional silver-zinc or silver-cadmium batteries in which the silver undergoes two stages of oxidation and a distinct drop in terminal voltage occurs at an early part of the discharge cycle.

The foregoing obects are realized, in accordance with the present invention, by using a foil of silver chloride as a starting material and combining this foil with a suitable collector, such as a wire grid or a perforated plate, into a plate-like structure representing the precursor of a battery electode. When this structure is introduced into a battery casing together with the necessary complement of other, like structures and suitable negative electrodes spaced therefrom by the usual separators, the subsequent addition of the alkaline electrolyte converts the silver chloride into silver oxide while simultaneously causing the separators to swell and placing the entire assembly under pressure. As a result of this compression, the structural weakening of the positive plates by the oxidation of their silver chloride will not lead to any disintegration of the electrodes thus formed, the silver oxide (and, after discharge, the silver) being firmly held onto its collector by the surrounding separator sheets. The battery may then be repeatedly charged and discharged in the well-known manner, the extreme thinness of the positive electrodes affording a higher yield and storage capacity than otherwise obtainable with a given mass of silver.

The electrolyte may initially consist of potassium hydroxide, in which case the reaction between it and the silver chloride proceeds as follows:

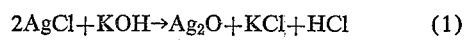
$$2AgCl + KOH \rightarrow Ag_2O + KCl + HCl \qquad (1)$$

The electrolyte may also be initially saturated with zinc so as to consist essentially of an aqueous solution of potassium zincate, the reaction then proceeding in the following manner:

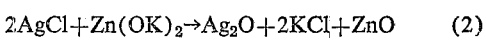
$$2AgCl + Zn(OK)_2 \rightarrow Ag_2O + 2KCl + ZnO \qquad (2)$$

It will be seen that in each instance the silver chloride is converted into silver suboxide $Ag_2O$, this being one of the possible states of oxidation of silver. In ordinary silver-containing batteries the metal of the positive plates is converted on charge first to silver suboxide and then to silver peroxide, the latter stage resulting in a higher terminal voltage; yet since oxidation is never uniform, parts of the plate will contain the peroxide while other are still in the suboxidized or even in the metallic state, whereby the total yield may not be greater than if the entire plate had been converted to $Ag_2O$. In a battery according to the invention the presence of chlorine ions in the electrolyte militates against the peroxide state yet tends to spread oxidation uniformly over the entire electrode body, thereby producing a plate of large storage capacity adapted to give rise to an output voltage dwelling over substantially the entire useful portion of the discharge cycle on a single level or plateau.

The invention will be further described with reference to the accompanying drawing in which.

Figure 1:
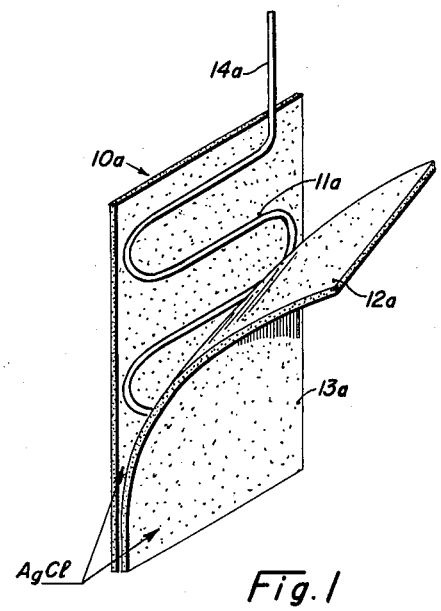
FIG. 1 is a perspective view of an electrode structure according to the invention, shown in an incompleted state.

The structure 10a of FIG. 1 comprises a current collector in the form of a looped wire 11a, preferably of silver, sandwiched between two sheets or foils 12a, 13a of silver chloride. A projecting portion 14a of wire 11a serves as a terminal lead. The foils 12a, 13a are brought into intimate contact with the wire and with each other by any suitable means, such as a pair of pressure rollers (not shown) between which the entire assembly of FIG. 1 is forced to pass.

Figure 2:
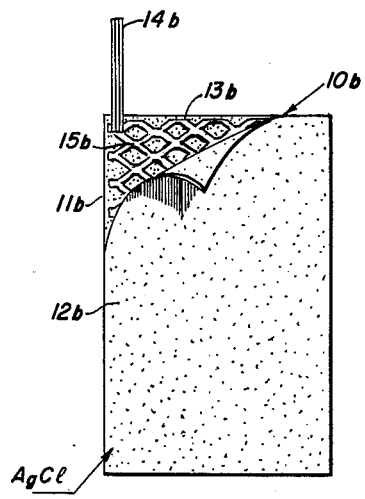
FIG. 2 is a front-elevational view of a modified structure according to the invention.

The electrode structure 10b of FIG. 2 comprises a support 11b in the form of a perforated plate, e.g. of the so-called expanded-metal type, which again consists preferably of silver and terminates in a tab 14b serving as a connector. A foil 12b of silver chloride is maintained in intimate contact with support 11b so that its material penetrates between the interstices 15b thereof and makes contact with the material of a second foil 13b on the opposite side. It will be understood that the second foil is not absolutely necessary and may be omitted if desired.

The collector and/or supporting members 11a, 11b should be of a thickness comparable to that of the silver-chloride sheets so that the entire structure 10a or 10b may have a thickness of preferably not more than 0.1 mm.

Figure 3:
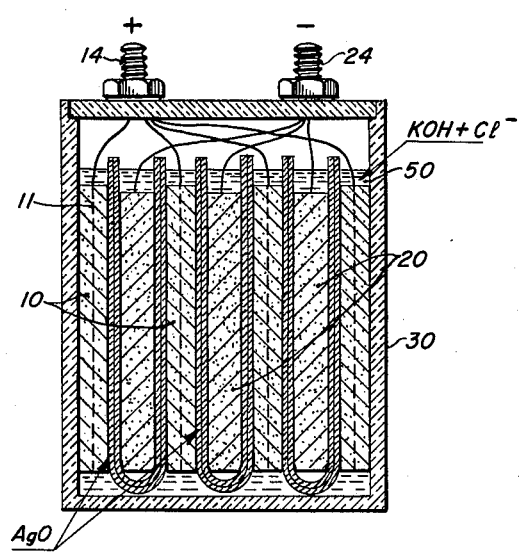
FIG. 3 is a somewhat diagrammatic view of a finished battery incorporating electrode structures of the type shown in the preceding figures.

FIG. 3 shows a battery whose casing 30 contains positive electrodes 10 with internal collectors 11 and terminal leads 14 extending therefrom, negative electrodes 20 provided with similar terminal leads 24, and intervening separators 40, e.g. of regenerated cellulose, which are swellable in the electrolyte 50. While the electrodes 10 were initially of a form as shown in FIG. 1 or 2, the addition of the liquid 50 converted the silver chloride thereof to silver oxide held under pressure between the separators 40, the oxidation process also resulting in an enrichment of the electrolyte with chlorine ions. It will be apparent that the compression of the electrode assembly 10, 20, 40 is due to the limited clearance with which the same was introduced into casing 30 in the dry state.

If the electrode assembly in casing 30 is kept dry, it can be stored for a prolonged period without undergoing any appreciable chemical changes. As soon as the electrolyte 50 is added, the afore-stated reactions occur and the battery is ready for instant use.

Various modifications and adaptations of the embodiments herein disclosed will be apparent to persons skilled in the art and are deemed to be embraced within the spirit and scope of the invention as defined in the appended claims.

This application is a division of application Serial No. 584,906, filed May 15, 1956, now abandoned.

I claim:

1. The method of making a battery electrode containing silver which comprises the steps of bringing together a conductive collector and a foil of silver chloride to form an electrode precursor and subsequently converting the silver chloride to silver oxide while said silver chloride foil is maintained in contact with said conductive collector.

2. The method according to claim 1, wherein the conversion of the silver chloride is carried out in an alkaline electrolytic solution.

3. The method according to claim 2, wherein the conversion of the silver chloride is carried out inside a battery casing upon introduction of said structure into said casing as part of an electrode assembly.

4. The method of making a battery electrode containing silver which comprises the steps of sandwiching a conductive collector between two foils of silver chloride, forming a plate-like structure by forcing said foils and said collector into intimate contact with one another, and subsequently converting the silver chloride to silver oxide.

5. A process for making an alkaline battery having an electrode assembly with at least one positive electrode, at least one negative electrode and an intervening separator held in a casing, said positive electrode containing oxidized silver as its active material, which comprises the steps of forming the electrode assembly by juxtaposing the negative electrode and a separator with a foil of silver chloride and a conducting collector adjacent said foil, introducing the electrode assembly thus formed into the casing, and adding an alkaline electrolyte capable of converting the silver chloride into silver oxide.

References Cited in the file of this patent

UNITED STATES PATENTS

| | | |
|---|---|---|
| 405,196 | Barrett | June 11, 1889 |
| 692,298 | Jungner | Feb. 4, 1902 |
| 2,428,850 | Lawson | Oct. 14, 1947 |
| 2,654,795 | Brill et al. | Oct. 6, 1953 |
| 2,778,754 | Shorr | Jan. 22, 1957 |

FOREIGN PATENTS

| | | |
|---|---|---|
| 712,561 | Great Britain | July 28, 1954 |
| 1,023,734 | France | Dec. 30, 1952 |